Aug. 19, 1930.  C. R. PEUSER  1,773,639
HAND CONTACT DEVICE FOR ELECTRIC HORNS FOR AUTOMOBILES AND THE LIKE
Filed April 16, 1927    2 Sheets-Sheet 1
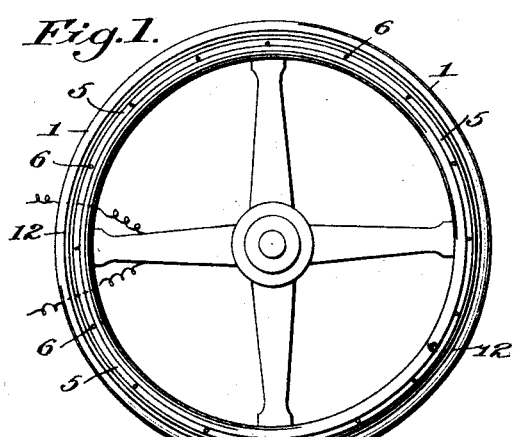
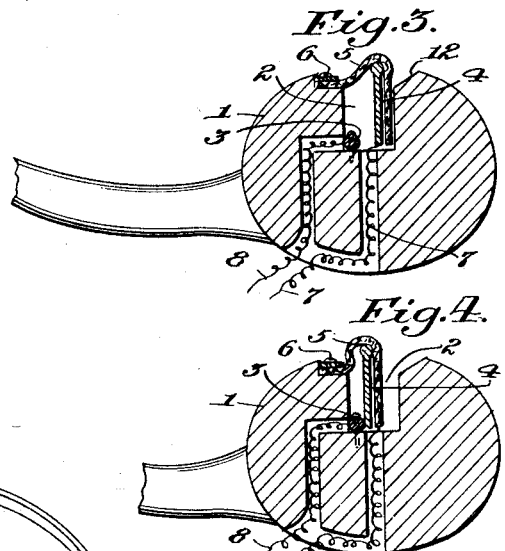
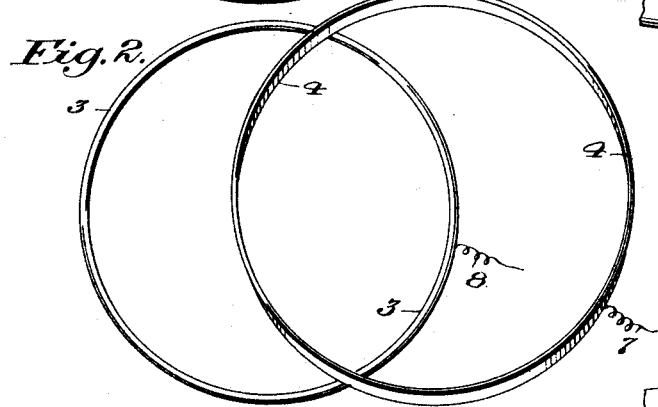
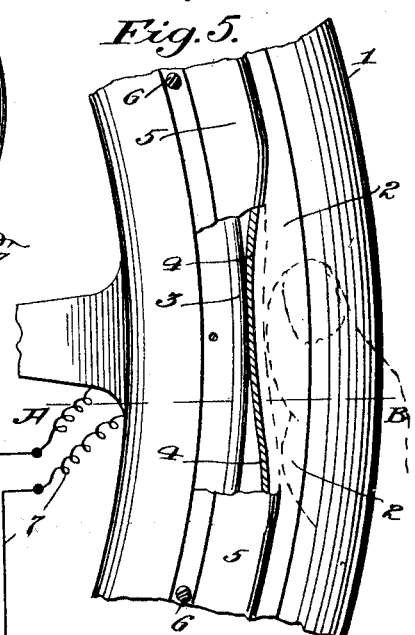
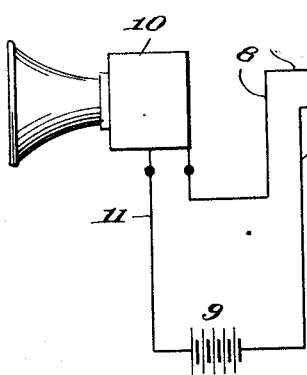
Inventor:
Carlos Rache Peuser, Aug. 19, 1930.  C. R. PEUSER  1,773,639
HAND CONTACT DEVICE FOR ELECTRIC HORNS FOR AUTOMOBILES AND THE LIKE
Filed April 16, 1927  2 Sheets-Sheet 2
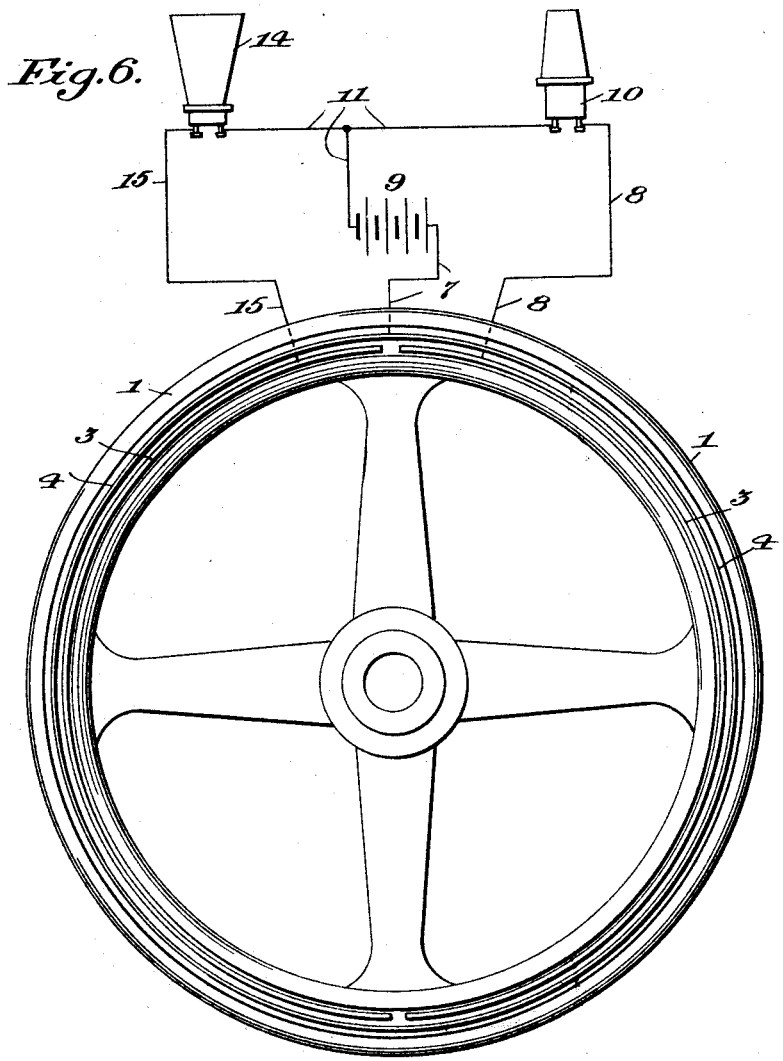
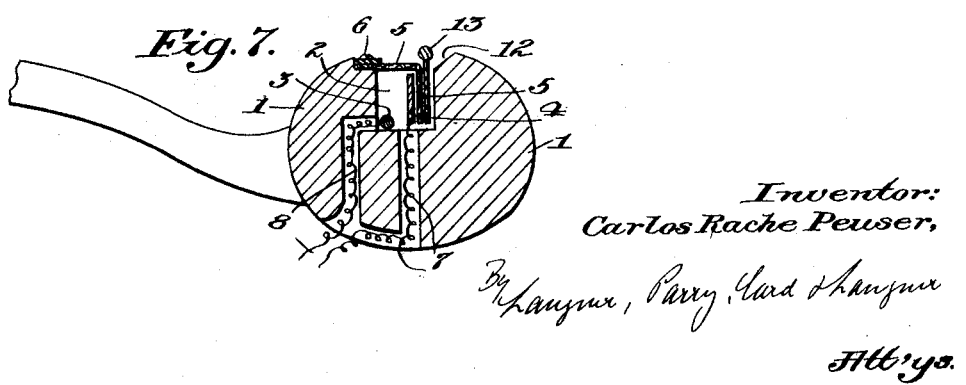
Inventor:
Carlos Rache Peuser, Patented Aug. 19, 1930

1,773,639

UNITED STATES PATENT OFFICE

CARLOS RACHE PEUSER, OF VILLA DEVOTO, ARGENTINA

HAND CONTACT DEVICE FOR ELECTRIC HORNS FOR AUTOMOBILES AND THE LIKE

Application filed April 16, 1927, Serial No. 184,386, and in Argentina November 10, 1926.

This invention relates to a new hand contact for electric horns for use in automobiles and the like and has for its object to complement the facilities of the driving of automobiles, avoiding the abandoning of the steering wheel when making use of the horn, as many accidents occur in the cases of confusion in the traffic when for the sake of asking for a free passage by means of the horn the driver is deprived from effecting a sudden and saving turn of the vehicle, or in the unnoticed crossing of other vehicles, having always to suffer great losses. Disregarding the driver's practice and his dominion of the car, it is always convenient to provide means which will give greater facility to effect the rapid manœuvers which are at all times necessary to save many and frequent victims. For this reason, the new hand contact for electric horns will be unanimously accepted as it is most convenient and handy, its cost is low, it is well protected and constantly within reach of the driver, i. e. on the hoop itself of the steering wheel, where a channel is made to allow space for two concentric rings of which the outer one is flexible and can touch the inner ring by simply pressing the former with the thumb, so that the driver will not have to abandon the wheel in order to operate the horn, being thus able to effect apart from the feet actions, various simultaneous movements as for instance, use the hand brake while at same time with the other hand he can operate the steering wheel and sound the horn. This action has many and great advantages in cases of danger with the consequent benefits for personal safety and the car.

With regard to applying the contact device to a car, same is very simple and consequently cheap in price, being constructed in such a manner that when gripping the steering wheel the contacts cannot be accidentally pressed, as otherwise it would result inconveniently and the driving would not be safe.

In order that the object of this invention may be more clearly understood, same has been illustrated with various drawings which are represented by way of example and chiefly in a schematic character as regards the principles of the invention, in which:

Figure 1 is a top view of an automobile steering wheel on which the contact device for the electric horn has been applied.

Figure 2 is a view of the two contact rings designed to be placed within the channel practiced on said steering wheel.

Figure 3, represents a cross section of a portion (right hand side) of the steering wheel where the channel has been practiced and the two contact rings adapted therein which are enclosed together and are capable of connection through side pressing of the outer flexible ring, and also showing on both contact elements the conductors leading respectively to the batteries and to the binding-posts of the horn.

Figure 4 in the same cross-section represented in Figure 3 but showing, under hand action, the engagement of both contacts for the sounding of the horn; also it shows a section A—B of Figure 5.

Figure 5 shows a hand action in the engagement of the contacts, indicating schematically the closure of the circuit on the automobile horn.

Figure 6 illustrates another scheme of the circuit for two horns independent on the automobile, the fixed annular cable of which is segmented in two complementary arcs which are connected independently to different horns.

Figure 7 is another cross-section of a portion (right hand side) of a steering wheel showing the addition of another external ring for the hand action of which to be transmitted to the internal ring for contact with the fixed cable.

Similar reference numbers indicate like or corresponding parts throughout the different figures.

As can be seen in the drawings, the circumferential channel 2 is practiced concentrically on the top part of the steering wheel 1 (Figures 3, 4 and 7) in which the annular cable 3 is disposed on the interior part (towards the centre of the wheel) being conveniently fixed by means of screws or clamps, while the ring 4 is externally adapted and maintained at a constant distance from the cable 3 all the way through and is formed by an endless metal tape, as can be seen in Figure 2, the upper edge of which is blunt so as to offer no sharp edge to the hand. Both said elements are covered by a binding 5 of leather or other suitable material (Figures 1, 3 and 4) which, covering all the space offered by the channel 2, is fixed in the internal part by means of ring 6 which is taken by screws, while in the opposite part it is adhered to the outer face of the ring 4, thus protecting both rings from dust and water. Then, at any point of the ring 4 and at another point of the cable 3 the interrupted conductors 7 and 8 are respectively joined (as indicated in Figs. 2, 3, 4 and 5) of which the former leads from the battery 9 (Fig. 5) while the latter 8 is connected to the corresponding horn 10 which in turn directly receives another conductor 11 of the same battery 9 as it is common in the general installation of automobile electric horns. Therefore, the ring 4 being made of a suitable metal, by its circumferential character it will be resilient and on being overcome in its constant line by a lateral force, will be capable of going back immediately to its normal position and equidistance relative to the annular cable 3, with which, as mentioned above, it is concentric and both are placed within the channel 2. Thus, when pressing inwardly at any point of the ring 4 disposed in the steering wheel 1 and covered by the binding 5 (as indicated graphically in Figures 4 and 5) said ring will be easily overcome in that part, making it touch the cable 3 thus establishing a contact and closing the circuit from the battery 9, through the conductors 7 and 8 of the horn 10 (Figure 5).

In this way an easy contact for the closing of the circuit is obtained, as the driver will not find it necessary to abandon the wheel to effect the alarm, as the action of said contacts is within reach of his thumbs or any other finger which can act even in the most imminent danger, owing to the fact that any point of the circumference of the steering wheel offers the same character and disposition for the actioning of the submitted horn, the groove 12 (Figures 3 and 4) being provided in order to facilitate the access of the fingers to the ring 4, said groove being practiced in its perimeter and in lateral continuation of the channel 2, in certain cases adapting an additional ring 13 (Figure 7) to facilitate the hand action, said ring having in this case a blunt edge, since the ring 4 can be of smaller proportions and always isolated and placed within the binding 5.

It is to be understood that the cable 3 and ring 4 may be constructed in any suitable manner which will prevent contact therebetween. While no particular claim as to the novelty of the particular construction employed, is presented herewith, the following construction is given by way of exemplification: The cable 3 may have a diameter normally slightly less than that of the innermost face of the channel 2 of the hoop 1. It might also be made of spring material, or if desirable the cable may be made of spring material and at the same time have a diameter normally slightly less than that of the interior of the channel 2 so that it must be expanded when inserted in the channel and will snugly grip the innermost face thereof. On the other hand the ring 4 may be made of springlike or similar material and have a normal diameter slightly in excess of that of the outermost face of the ring 4 so that when it is inserted in position it will expand to normally snugly fit the exterior thereof. As stated above, it is to be understood that the foregoing construction is merely by way of explanation and may be varied at will without departing from the spirit of the invention.

Later, when the vehicle may possess two or more horns (Figure 6) the fixed cable 6 will be divided in as many segments as there are horns to be independently connected, so that each part will be joined to the respective conductor of each horn 10 or 14, as may be seen in Figure 6, with the conductors 8 and 15 so that by pressing indistinctly any part, the contact will equally take place by means of the ring 4 for actuating either one or the other horn 10 and 14.

Claims:

1. In a steering wheel for automobiles or similar vehicles, a rim on said wheel having an annular recess sunk in the uppermost surface thereof, a plurality of substantially concentric normally separated rings mounted in said recess, one of said rings being arranged exteriorly of the other, away from the center of said steering wheel, said rings being connected to the terminals of an electric circuit, the outermost of said rings being both flexible and resilient and extending upwardly from said recess whereby it may be subjected to movement towards and away from the other of said rings.

2. In a steering wheel for automobiles or similar vehicles, a rim for said steering wheel having an annular recess sunk in the upper surface thereof, a substantially fixed ring mounted in said recess adjacent the innermost surface thereof, and a relatively flexible and resilient ring mounted in said recess outwardly of and substantially concentrically with said first mentioned ring, adjacent the outermost surface of said recess, said flexible ring extending from said recess whereby it may be subjected to movement towards and away from said fixed ring, the said rings each being connected to a terminal of an electric circuit.

3. In a steering wheel for automobiles or similar vehicles, a rim for said steering wheel having an annular recess sunk into the upper surface thereof, a substantially fixed ring mounted in said recess, a relatively flexible ring arranged outwardly of and substantially concentrically with said fixed ring, said last mentioned ring extending upwardly from said recess, whereby it may be subjected to movement towards and away from said fixed ring, and a bevelled lip on the upper edge of the outermost surface of the recess, to facilitate actuation of the said resilient ring.

4. In a steering wheel for automobiles or similar vehicles, a rim for said steering wheel having an annular recess mounted in the upper surface thereof, a substantially fixed ring in said recess, adjacent the innermost surface thereof, a relatively flexible and resilient ring mounted in said recess and arranged substantially concentrically with said first mentioned ring, the said first mentioned ring being divided into a plurality of parts, each part being connected with a terminal of an electric circuit, and the said flexible ring being connected to the common terminals of said circuits, whereby movement of the flexible ring into contact with said rigid ring will close a selected one of said circuits.

In testimony whereof, I have signed my name to this specification.

CARLOS RACHE PEUSER.